(12) United States Patent
Inami et al.

(10) Patent No.: US 7,997,638 B2
(45) Date of Patent: Aug. 16, 2011

(54) DOOR STRUCTURE OF VEHICLE, IN WHICH DOOR JOINT AND GARNISH GAP ARE OFFSET IN DOOR ARRANGEMENT DIRECTION

(75) Inventors: Nobuyuki Inami, Utsunomiya (JP); Masatoshi Mori, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 247 days.

(21) Appl. No.: 12/441,086

(22) PCT Filed: Sep. 18, 2007

(86) PCT No.: PCT/JP2007/068091
§ 371 (c)(1),
(2), (4) Date: Mar. 12, 2009

(87) PCT Pub. No.: WO2008/041473
PCT Pub. Date: Apr. 10, 2008

(65) Prior Publication Data
US 2010/0019543 A1   Jan. 28, 2010

(30) Foreign Application Priority Data

Sep. 27, 2006   (JP) .................................. 2006-262040

(51) Int. Cl.
*B60J 5/04* (2006.01)

(52) U.S. Cl. .................................................. 296/146.9
(58) Field of Classification Search ............... 296/146.9, 296/1.08
See application file for complete search history.

(56) References Cited

U.S. PATENT DOCUMENTS 4,707,020 A   11/1987   Enokida et al.

FOREIGN PATENT DOCUMENTS

| JP | 62-23874 | 1/1987 |
|----|----------|--------|
| JP | 64-2649 | 1/1989 |
| JP | 08-058383 | 3/1996 |
| JP | 11-334391 | 12/1999 |
| JP | 2005-289304 | 10/2005 |
| JP | 2005-315361 | 11/2005 |

*Primary Examiner* — H Gutman
(74) *Attorney, Agent, or Firm* — Rankin, Hill & Clark LLP

(57) ABSTRACT

A door structure of a vehicle, in which between the outer surfaces of a first garnish at a first door and a second garnish at a second door, a garnish gap, which joins a door gap between the door, is provided; the first door has a first garnish attachment part, and at an end of this part, the end facing the second door, an expanded part is provided, which protrudes toward the second door; the second door has a second garnish attachment part, and at an end of this part, the end facing the first door, a recessed part is provided, which is recessed in a direction away from the first door; and with respect to the garnish gap, a door joint between the first garnish attachment part and the second garnish attachment part is offset toward the second door in a direction in which the doors are arranged.

8 Claims, 3 Drawing Sheets

DOOR STRUCTURE OF VEHICLE, IN WHICH DOOR JOINT AND GARNISH GAP ARE OFFSET IN DOOR ARRANGEMENT DIRECTION

TECHNICAL FIELD

The present invention relates to a door structure of vehicles.

Priority is claimed on Japanese Patent Application No. 2006-262040, filed Sep. 27, 2006, the content of which is incorporated herein by reference.

BACKGROUND ART

In a known door structure, a garnish made of resin is attached to each of adjacent doors, and a screen is put on a garnish gap (i.e., a gap between the garnishes attached to the doors) so that door panels or body panels are invisible between the garnishes.

For example, Patent Document 1 discloses a door structure in which a flange part is formed at an end of one of the garnishes in a manner such that it extends toward the backside of the other garnish, so that ends of both garnishes overlap each other.

Patent Document 1: Japanese Unexamined Patent Application, First Publication No. H8-58383.

However, as a garnish made of resin has thermal expansion (or thermal extension), the size of the above flange part cannot be large in consideration of prevention of interference between the garnishes when the doors are closed. Therefore, a larger part is visible through the garnish gap, which degrades outward appearance. Additionally, as the interval between the closed doors should be large in consideration of prevention of interference, the appearance of a door gap line (i.e., a boundary line between the two doors) is inferior.

DISCLOSURE OF INVENTION

In light of the above circumstances, an object of the present invention is to provide a door structure of a vehicle, which can prevent an inside part from being visible through the garnish gap, and has a superior appearance.

Therefore, the present invention provides a door structure of a vehicle (e.g., a vehicle 1 in an embodiment explained later) having a first door (e.g., a rear door 10 in the embodiment) provided in the body of the vehicle (e.g., a vehicle body 2 in the embodiment), and a second door (e.g., a front door 30 in the embodiment) provided adjacently to the first door, wherein:

there is a door gap (e.g., a door gap 90 in the embodiment) between the outer surface (e.g., an outer surface 11 in the embodiment) of the first door and the outer surface (e.g., an outer surface 31 in the embodiment) of the second door;

a first garnish (e.g., a rear-door lower garnish 50 in the embodiment) and a second garnish (e.g., a front-door lower garnish 70 in the embodiment), each made of resin, are respectively attached to the outer surfaces of the first door and the second door, and a garnish gap (e.g., a garnish gap 91 in the embodiment), which joins the door gap, is provided between the outer surface (e.g., an outer surface 55 in the embodiment) of the first garnish and the outer surface (e.g., an outer surface 75 in the embodiment) of the second garnish;

the first door has a first garnish attachment part (e.g., a garnish attachment part 12 in the embodiment), to which the first garnish is attached, and at an end of the first garnish attachment part, said end facing the second door, an expanded part (e.g., an expanded part 13 in the embodiment) is provided, which protrudes toward the second door;

the second door has a second garnish attachment part (e.g., a garnish attachment part 32 in the embodiment), to which the second garnish is attached, and at an end of the second garnish attachment part, said end facing the first door, a recessed part (e.g., a recessed part 33 in the embodiment) is provided, which is recessed in a direction away from the first door; and with respect to the garnish gap, a door joint (e.g., a door joint 92 in the embodiment) between the first garnish attachment part and the second garnish attachment part is offset toward the second door in a direction in which the doors are arranged.

In accordance with the above structure, the door gap and the garnish gap can join each other. In addition, as the door joint between the first garnish attachment part and the second garnish attachment part is offset with respect to the garnish gap in the direction in which the doors are arranged, it is possible to prevent an inner part from being observed through the garnish gap. Furthermore, it is possible to easily prevent interference in the closed door state when the garnishes made of resin thermally expand (or extend). In addition, there is no increase in the width of the door gap in consideration of interference, thereby improving the outward appearance.

In the present invention, the direction in which the doors are arranged means a direction in which the doors provided side by side are arranged, and thus corresponds to the front-to-back direction when the front door and the rear door are arranged in the front-to-back direction of the vehicle body.

In a typical example, a garnish joint (e.g., a garnish joint 93 in the embodiment) between the first garnish and the second garnish has a surface-side joint part (e.g., a surface-side joint part 94 in the embodiment) formed closer to the outside of the vehicle, and an inner-side joint part (e.g., an inner-side joint part 95 in the embodiment) formed closer to the interior of the vehicle;

the surface-side joint part forms the garnish gap which joins the door gap; and the inner-side joint part joins the door joint, and is offset toward the second door with respect to the surface-side joint part in the direction in which the doors are arranged.

In accordance with the above structure, it is possible to prevent a door end part from being visible through the garnish gap, and to provide feeling of continuity between the first garnish and the second garnish.

In a first preferable example of this case, in the door joint, the ends of the first garnish attachment part and the second garnish attachment part are respectively provided along the ends of the first garnish and the second garnish in the inner-side joint part.

Accordingly, the ends of each garnish can coincide with the relevant end of each door, thereby improving the rigidity with respect to the attachment of each garnish.

In a second preferable example of the above case, in the surface-side joint part, a recessed part (e.g., a recessed part 54 in the embodiment) is provided in the first garnish, and a protruding part (e.g., a protruding part 73 in the embodiment) is provided in the second garnish.

Accordingly, it is possible to reliably prevent interference between the garnishes in the closed door state, due to thermal expansion (or extension) of the garnishes.

In accordance with the present invention, as the door gap and the garnish gap join each other, the appearance of the gaps is improved. Additionally, it is possible to prevent an inside part from being observed through the garnish gap, thereby improving the outward appearance. Furthermore, it is possible to prevent interference in the closed door state when the garnish made of resin thermally expands (or extends). In addition, there is no increase in the width of the door gap in consideration of interference, thereby improving the outward appearance.

In accordance with the above typical example, it is possible to prevent a door end part from being visible through the garnish gap, and to provide feeling of continuity between the first garnish and the second garnish, thereby improving the outward appearance of the gap, and thus improving salability of the vehicle.

In accordance with the above first preferable example, it is possible to improve the rigidity with respect to the attachment of the garnishes.

In accordance with the above second preferable example, it is possible to reliably prevent interference between the garnishes in the closed door state, due to thermal expansion (or extension) of the garnishes.

BEST MODE FOR CARRYING OUT THE INVENTION

Below, an embodiment of the door structure of a vehicle in accordance with the present invention will be explained with reference to FIGS. 1 to 5. In the following explanation, the "front-to-back direction" coincides with the front-to-back direction of a relevant vehicle.

Figure 1:
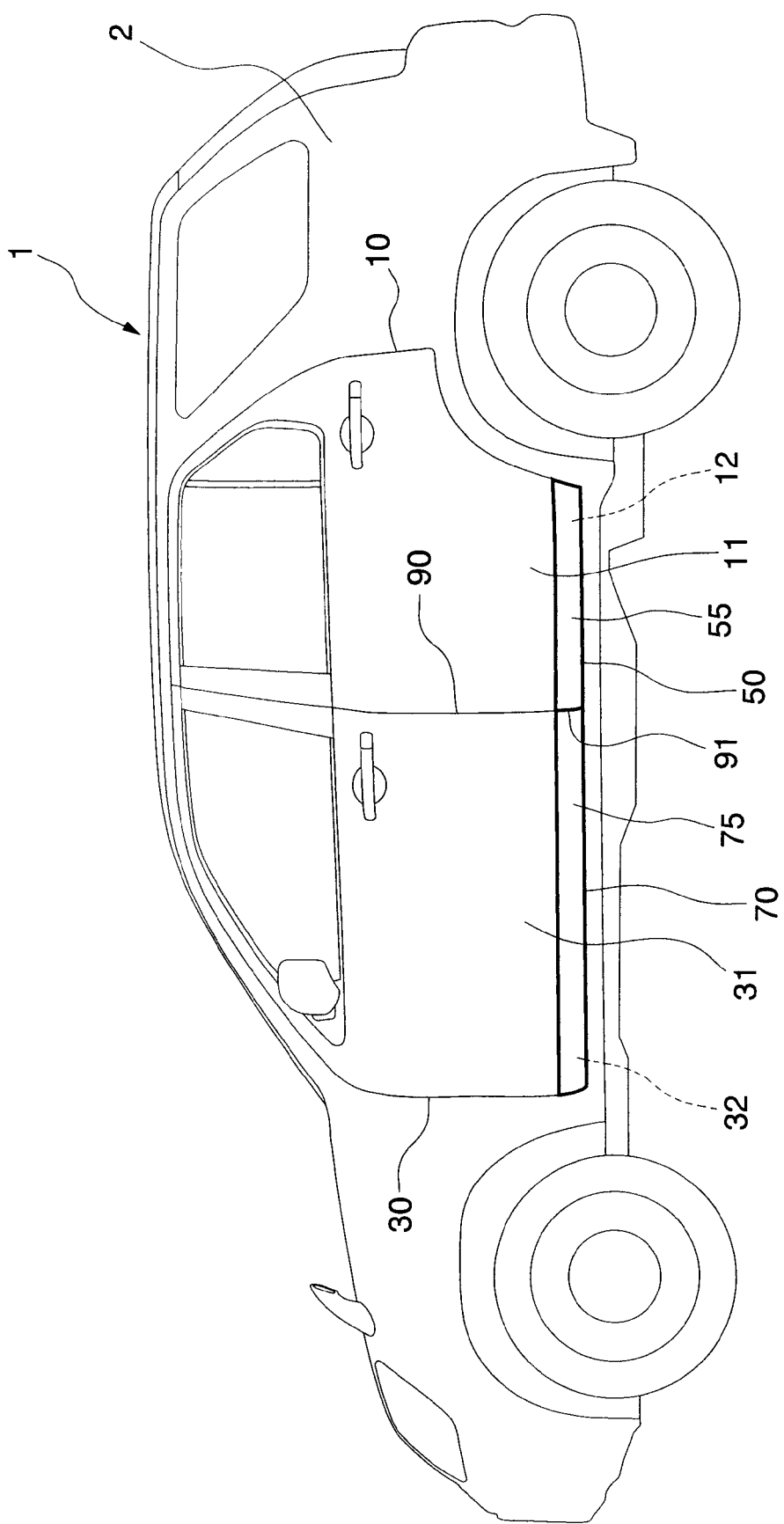
FIG. 1 is a side view of a vehicle having a door structure as an embodiment in accordance with the present invention.

As shown in FIG. 1, on right and left sides of a vehicle body 2 of a vehicle 1, a rear door 10 (i.e., a first door) and a front door 30 (i.e., a second door) are arranged side by side. Each door can be opened and closed around its front end, which functions as the rotation center.

Figure 2:
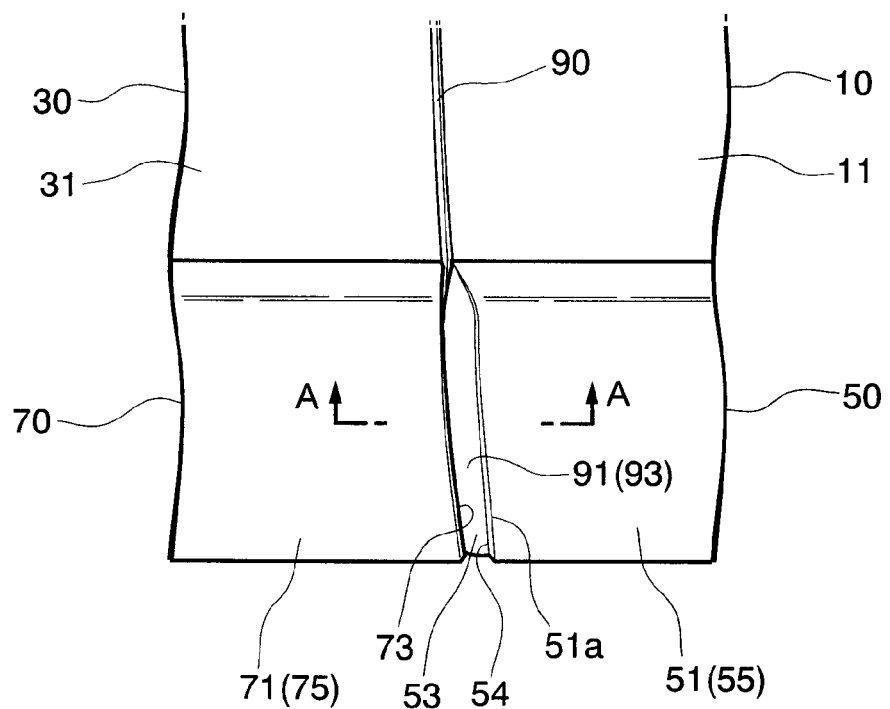
FIG. 2 is an enlarged side view showing the periphery of the garnish gap.

As shown in a partially-enlarged view of FIG. 2, there is a slight gap between the front end of the outer surface 11 of the rear door 10 and the rear end of the outer surface 31 of the front door 30, and this gap is called a "door gap 90".

Figure 4:
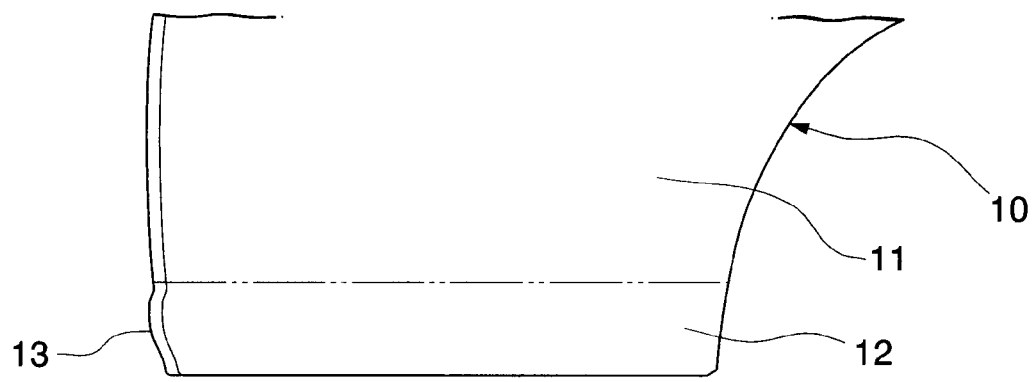
FIG. 4 is a side view of a lower part of the rear door.

FIG. 4 is an enlarged view of a lower part of the rear door 10. As shown in FIG. 4, the lower end of the rear door 10 functions as a garnish attachment part 12 (i.e., a first garnish attachment part), which has a predetermined vertical width, and is arranged along the entire length in the front-to-back direction. As shown in FIG. 1, to the outer surface 11 in the garnish attachment part 12, a rear-door lower garnish 50 (i.e., a first garnish) is attached along the entire length in the front-to-back direction.

Figure 5:
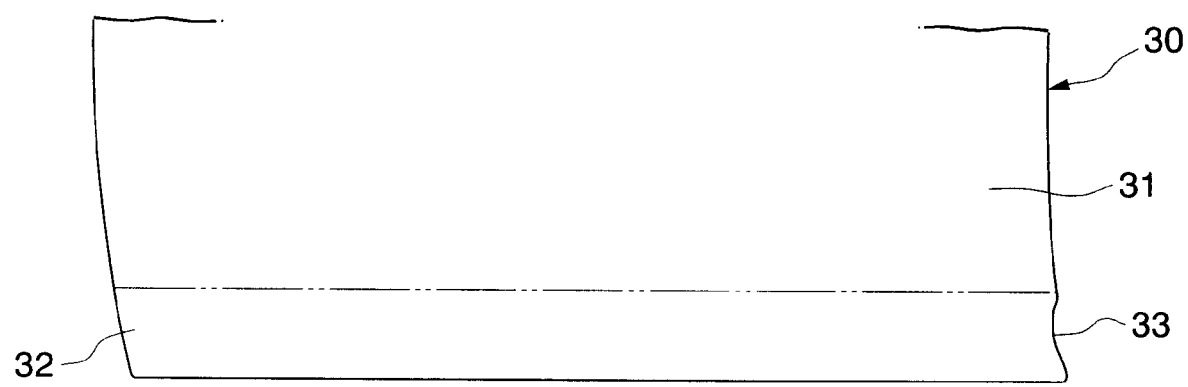
FIG. 5 is a side view of a lower part of the front door.

FIG. 5 is an enlarged view of a lower part of the front door 30. As shown in FIG. 5, the lower end of the front door 30 functions as a garnish attachment part 32 (i.e., a second garnish attachment part), which has a predetermined vertical width, and is arranged along the entire length in the front-to-back direction. As shown in FIG. 1, to the outer surface 31 in the garnish attachment part 32, a front-door lower garnish 70 (i.e., a second garnish) is attached along the entire length in the front-to-back direction.

There is a slight gap between the front end of the outer surface 55 of the rear-door lower garnish 50 and the rear end of the outer surface 75 of the front-door lower garnish 70, and this gap is called a "garnish gap 91". As shown in FIGS. 1 and 2, the garnish gap 91 joins the door gap 90.

Figure 3:
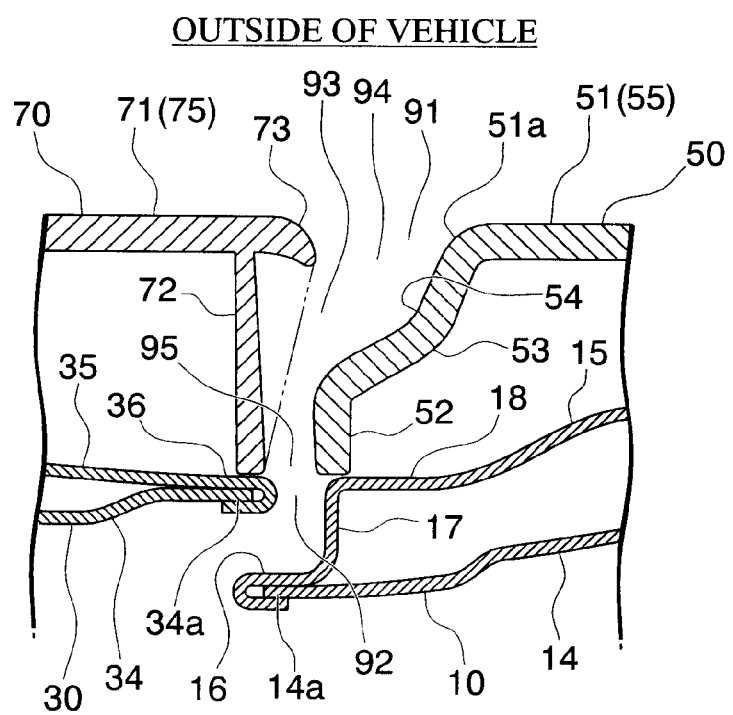
FIG. 3 is a sectional view along line A-A in FIG. 2.

The garnish gap 91 will be explained in detail with reference to a sectional view of FIG. 3.

The rear door 10 has a rear-door inner panel 14 and a rear-door outer panel 15, and a front edge part 14a of the rear-door inner panel 14 and a front edge part 16 of the rear-door outer panel 15 are combined by hemming (processing). The front edge part 16 of the rear-door outer panel 15 extends so as to approach the front door 30 (i.e., toward the front side of the vehicle body). From the rear end of the front edge part 16, a perpendicular part 17 stands substantially perpendicularly and extends toward the outside of the vehicle. From an end (toward the outside of the vehicle) of the perpendicular part 17, a flat part 18 extends in a direction away from the front door 30 (i.e., toward the back side of the vehicle body).

The front door 30 also has a front-door inner panel 34 and a front-door outer panel 35, and a rear edge part 34a of the front-door inner panel 34 and a rear edge part 36 of the front-door outer panel 35 are combined by hemming (processing). The rear edge part 36 of the front-door outer panel 35 extends so as to approach the rear door 10 (i.e., toward the back side of the vehicle body).

When the rear door 10 and the front door 30 are both closed (below, simply called "in the closed door state"), the front end of the flat part 18 in the rear-door outer panel 15 and the rear end of the rear edge part 36 in the front-door outer panel 35 face each other via a specific gap therebetween, so that the outer surface of the flat part 18 and the outer surface of the rear edge part 36 form a substantial plane. Additionally, in comparison with the rear edge part 36 of the front-door outer panel 35, the front edge part 16 of the rear-door outer panel 15 is positioned more inner by the height (length) of the perpendicular part 17, so that the heads of the front edge part 16 and the rear edge part 36 overlap each other when being observed from the relevant side of the vehicle.

In the closed door state, a gap between (i) the front edge part 16 and the perpendicular part 17 of the rear-door outer panel 15 and (ii) the rear edge part 36 of the front-door outer panel 35 is called a "door joint 92".

The rear-door lower garnish 50 and the front-door lower garnish 70 each have a substantially U-shaped section, which is open toward the door outer surface 11 or 31.

A design wall part 51 of the rear-door lower garnish 50 is distanced from the rear-door outer panel 15 toward the outside of the vehicle by a specific distance. The front edge 51a of the design wall part 51 is positioned more backward in comparison with the perpendicular part 17 of the rear-door outer panel 15. In a front end part of the rear-door lower garnish 50, a front wall part 52 and a connection wall part 53 are provided, wherein the front wall part 52 is arranged along the front edge of the flat part 18 in the rear-door outer panel 15 so as to contact the flat part 18 substantially perpendicularly, and the connection wall part 53 connects an end (toward the outside of the vehicle) of the front wall part 52 with the front edge 51a of the design wall part 51. The connection wall part 53 forms a curved plane which is recessed toward a side away from the front door 30, so that the connection wall part 53 has a recessed part 54.

A design wall part 71 of the front-door lower garnish 70 is distanced from the front-door outer panel 35 toward the outside of the vehicle by a specific distance. In the closed door state, the outer surface 55 of the design wall part 51 in the rear-door lower garnish 50 and the outer surface 75 of the design wall part 71 in the front-door lower garnish 70 form a substantial plane. Here, the outer surface 55 of the design wall part 51 in the rear-door lower garnish 50 also functions as the outer surface 55 of the rear-door lower garnish 50, and the outer surface 75 of the design wall part 71 in the front-door lower garnish 70 also functions as the outer surface 75 of the front-door lower garnish 70.

In a rear end part of the front-door lower garnish 70, a rear wall part 72 is provided, which is arranged along the rear edge of the rear edge part 36 in the front-door outer panel 35, and contacts the rear edge part 36 substantially perpendicularly, so that an end (toward the outside of the vehicle) of the rear wall part 72 joins the design wall part 71 substantially perpendicularly. The rear end of the design wall part 71 protrudes more backward from the position where the design wall part 71 connects with the rear wall part 72, thereby forming a protruding part 73. In the closed door state, the rear end of the protruding part 73 almost coincides with the front end of the front wall part 52 in the rear-door lower garnish 50 when being observed from the relevant side of the vehicle.

In the closed door state, the protruding part 73 of the front-door lower garnish 70 faces the front edge 51a of the design wall part 51 in the rear-door lower garnish 50 via a gap having a specific width. The part between the outer surface 55 of the design wall part 51 in the rear-door lower garnish 50 and the outer surface 75 of the design wall part 71 in the front-door lower garnish 70 functions as the above-described garnish gap 91.

Also in the closed door state, the gap between (i) the front wall part 52 and the connection wall part 53 in the rear-door lower garnish 50 and (ii) the rear wall part 72 and the protruding part 73 in the front-door lower garnish 70 is called a "garnish joint 93".

The garnish joint 93 includes (i) a surface-side joint part 94, formed between the front edge 51a of the design wall part 51 in the rear-door lower garnish 50 and the protruding part 73 of the front-door lower garnish 70, and (ii) an inner-side joint part 95, formed between the front wall part 52 of the rear-door lower garnish 50 and the rear wall part 72 of the front-door lower garnish 70. The surface-side joint part 94 forms the garnish gap 91 which joins the door gap 90. The inner-side joint part 95 joins the door joint 92, which is formed between the garnish attachment part 12 of the rear door 10 and the garnish attachment part 32 of the front door 30. With respect to the surface-side joint part 94, the inner-side joint part 95 is offset toward the front of the vehicle, that is, in the door arrangement direction (i.e., the front-to-back direction along which the rear door 10 and the front door 30 are arranged side by side, in the present embodiment).

In order that the garnish 91 joins the door gap 90, and that the front wall part 52 of the rear-door lower garnish 50, which protrudes and is closer to the front door 30 in comparison with the front edge 51a of the design wall part 51, is arranged along the front edge of the flat part 18 in the rear-door outer panel 15, an expanded part 13, which protrudes toward the front door 30, is provided at the front end of the garnish attachment part 12 in the rear door 10 (see FIG. 4). In correspondence to the expanded part 13, a recessed part 33, which is recessed toward a direction away from the rear door 10, is provided at the rear end of the garnish attachment part 32 in the front door 30 (see FIG. 5).

In the above-described vehicle door structure, as the door gap 90 and the garnish gap 91 join each other in the closed door state, a superior outward appearance is obtained, thereby improving salability of the vehicle 1.

Also in the closed door state, the inner-side joint part 95 and the surface-side joint part 94 of the garnish joint 93 are offset from each other in the front-to-back direction. Furthermore, as the inner-side joint part 95 joins the door joint 92, the surface-side joint part 94 and the door joint 92 are also offset from each other in the front-to-back direction. In addition, when observed from the relevant side of the vehicle, the rear end of the protruding part 73 in the front-door lower garnish 70 almost coincides with the front end of the front wall part 52 in the rear-door lower garnish 50. Therefore, when the garnish gap 91 is observed from the relevant side of the vehicle, the rear-door lower garnish 50 and the front-door lower garnish 70 look to be joined together without a gap therebetween, thereby improving feeling of continuity with respect to the door lower garnish, and reliably preventing end parts of the rear door 10 and the front door 30 from appearing through the garnish gap 91. Accordingly, it is possible to improve the appearance of the garnish gap 91, and thus to improve the salability of the vehicle.

In addition, there is no increase in the width of the door gap 90 in consideration of interference, thereby improving the appearance.

Additionally, the front wall part 52 of the rear-door lower garnish 50 is provided along and contacts the front edge of the flat part 18 in the rear-door outer panel 15, and the rear wall part 72 of the front-door lower garnish 70 is provided along and contacts the rear edge of the rear edge part 36 in the front-door outer panel 35. Therefore, it is possible to improve the rigidity with respect to the attachment of the rear-door lower garnish 50 and the front-door lower garnish 70.

In addition, the recessed part 54 is provided at the connection wall part 53 of the rear-door lower garnish 50. Therefore, even when the front-door lower garnish 70 made of resin thermally expands and extends backward, interference between the rear-door lower garnish 50 and the front-door lower garnish 70 can be reliably prevented.

Furthermore, the front-door lower garnish 70 has the protruding part 73, which is positioned more backward in comparison with the rear wall part 72. Therefore, in comparison with a case of providing a thick wall having a linear surface from the head of the rear wall part 72 to the head of the protruding part 73 (as indicated by the alternate long and two short dashes line in FIG. 3), a larger relief can be provided between the front-door lower garnish 70 and the rear-door lower garnish 50 in consideration of thermal expansion. Accordingly, it is possible to reliably prevent the rear-door lower garnish 50 and the front-door lower garnish 70 from interfering with each other in the closed door state.

OTHER EMBODIMENTS

The present invention is not limited to the above-described embodiment.

For example, instead of the rear door 10 being the first door and the front door 30 being the second door in the above embodiment, the first door may be a front door, and the second door may be a rear door. In this case, an expanded part is formed at a garnish attachment part of the front door as the first door, and a recessed part is formed at a garnish attachment part of the rear door as the second door.

INDUSTRIAL APPLICABILITY

In accordance with the present invention, as the door gap and the garnish gap join each other, the appearance of the gaps is improved. Additionally, it is possible to prevent an inside part from being observed through the garnish gap, thereby improving the outward appearance. Furthermore, it is possible to prevent interference in the closed door state when the garnish made of resin thermally expands (or extends). In addition, there is no increase in the width of the door gap in consideration of interference, thereby improving the outward appearance.

The invention claimed is:

1. A door structure of a vehicle, comprising:
a first door provided in the body of the vehicle, and
a second door provided adjacent to the first door, wherein:
there is a door gap between an end of an outer surface of the first door and an end of an outer surface of the second door, where both ends face each other;
a first garnish and a second garnish, each made of resin, are respectively attached to the outer surfaces of the first door and the second door, and a garnish gap, which joins the door gap, is provided between the outer surface of the first garnish and the outer surface of the second garnish;
a first garnish attachment part, to which the first garnish is attached, is provided in a vertical portion of the first door, and at an end of the first garnish attachment part that is facing the second door, an expanded part is provided, which further protrudes toward the second door than the end of the outer surface of the first door, which forms the door gap;
a second garnish attachment part, to which the second garnish is attached, is provided in a vertical portion of the second door, and at an end of the second garnish attachment part that is facing the first door, a recessed part is provided, which is further recessed in a direction away from the first door than the end of the outer surface of the second door, which forms the door gap; and
with respect to the garnish gap, a door joint between the first garnish attachment part and the second garnish attachment part is offset toward the second door in a direction in which the doors are arranged.

2. The door structure in accordance with claim 1, wherein:
a garnish joint between the first garnish and the second garnish has a surface-side joint part formed closer to the outside of the vehicle, and an inner-side joint part formed closer to the interior of the vehicle;
the surface-side joint part forms the garnish gap which joins the door gap; and
the inner-side joint part joins the door joint, and is offset toward the second door with respect to the surface-side joint part in the direction in which the doors are arranged.

3. The door structure in accordance with claim 2, wherein:
in the door joint, the ends of the first garnish attachment part and the second garnish attachment part are respectively provided along the ends of the first garnish and the second garnish in the inner-side joint part.

4. The door structure in accordance with claim 2, wherein:
in the surface-side joint part, a recessed part is provided in the first garnish, and a protruding part is provided in the second garnish.

5. The door structure in accordance with claim 1, wherein:
at the door joint, an end of the first garnish conforms to an end of the second garnish when the doors are both closed and observed from a side of the vehicle.

6. The door structure in accordance with claim 1, wherein the first garnish attachment part is provided at the bottom of the outer surface of the first door and the second garnish attachment part is provided at the bottom of the outer surface of the second door.

7. The door structure in accordance with claim 1, wherein an edge part of the first door and an edge part of the second door overlap each other at the door joint when the first and second door close.

8. The door structure in accordance with claim 1, wherein the first door is a rear door and the second door is a front door.

* * * * *